Dec. 8, 1964     W. T. BURTON     3,160,546
TIRE BUILDING DRUM
Filed March 21, 1962
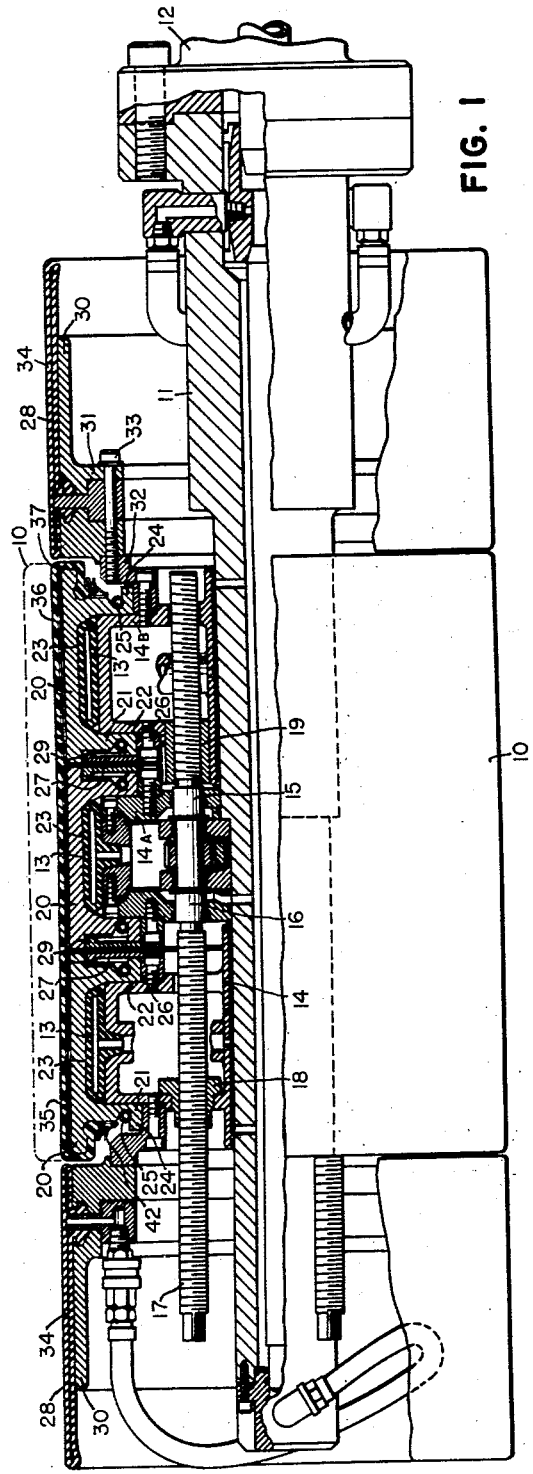
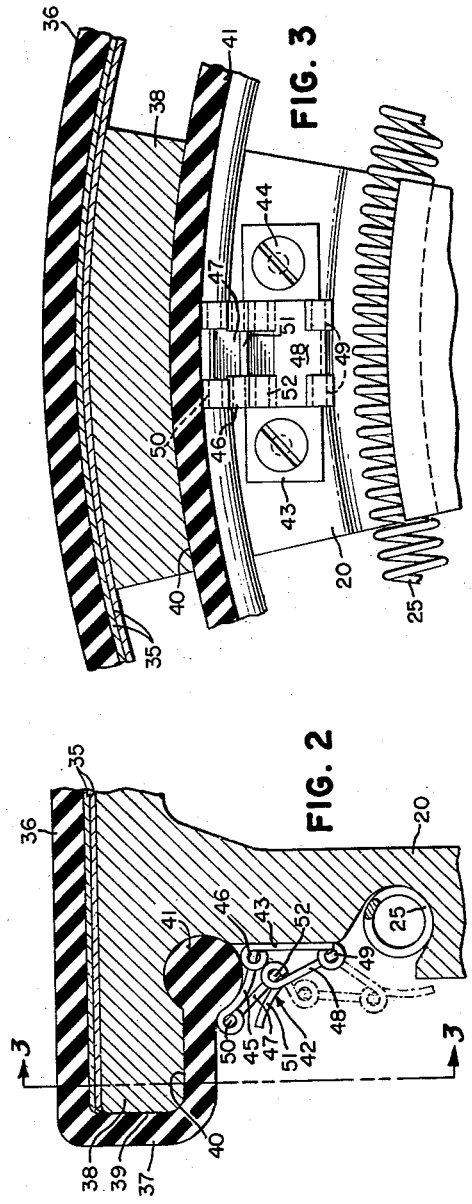
*INVENTOR.*
WILLIAM T. BURTON
BY
*J. B. Holden*
ATTORNEY

United States Patent Office 3,160,546
Patented Dec. 8, 1964

3,160,546
TIRE BUILDING DRUM
William T. Burton, Akron, Ohio, assignor to The Goodyear Tire & Rubber Company, Akron, Ohio, a corporation of Ohio
Filed Mar. 21, 1962, Ser. No. 181,412
3 Claims. (Cl. 156—416)

This invention relates to a drum or form for building tires and, more particularly, to improvements in a drum for building pneumatic tires which is covered with an elastomeric sleeve or cover.

In building or assembling pneumatic tires by the so-called flat band process, ply material consisting of parallel textile or metallic cords embedded in sheet rubber is wrapped or placed about a substantially cylindrical outer surface of a rigid drum or building form and stitched together, and the circumferential marginal edges of the ply material are folded radially inward over the ends of the drum or building form. Circular bead rings are then placed against the inturned edges of the ply material which are then folded about the bead rings to retain the latter in place. Thereafter, the drum or building form must be collapsed to allow the green tire to be removed. In order to bridge the spaces between the rigid elements of the drum, an elastomeric sleeve or cover is provided on the external surface.

The principal object of this invention is to provide an improved tire building drum in which the external surface thereof is surrounded by a rubber sleeve which is readily removable.

Another object of the invention is to provide a tire building drum with an improved means for attaching a rubber cover or sleeve to the end portions thereof, including a plurality of locking mechanisms attached to the drum and movable into an open and closed position to engage or disengage the ends of the sleeve.

Other objects, uses, and advantages of the invention will become more apparent to those skilled in the art from the following description and drawings in which;

FIG. 1 is a fragmentary longitudinal sectional view of the tire building drum of this invention with parts broken away and parts in section;

FIG. 2 is an enlarged partial sectional view of the end of the drum;

FIG. 3 is a partial cross-sectional view taken along the lines 3—3 of FIG. 2.

Referring more particularly to the drawings in which like parts are referred to by the same numeral throughout, a tire building drum 10 is mounted for rotation upon a rotatable shaft 11 secured to a drive spindle 12 which is rotated in either direction by a suitable power unit. This invention will be described and shown in the drawings in relationship to a drum which is radially and axially expandable. However, it is to be understood that drum 10 for the purposes of this invention may be non-expandable in a radial, or in an axial direction, or in both directions.

The drum 10 consists of a plurality of sections, each of which may be radially expanded by means of an inflatable annular bladder 13, which are mounted, respectively, upon a spider 14, 14a and 14b, each of which is, in turn, secured to the shaft 11. The central spider 14a is fixed to the shaft, and spiders 14 and 14b are axially slidably mounted on the shaft. The spider 14a is provided with journals 15 and 16 which rotatably support shaft 17 threaded to members 18 and 19 connected to the spiders 14 and 14b. Rotation of shaft 17 will cause spiders 14 and 14b to move axially relative to the spider 14a to thereby axially expand the drum.

Each of the spiders 14 through 14b supports, respectively, a plurality of rigid elongated circumferential narrow elements 20 having depending radially inwardly extending legs 21 which straddle the lateral surfaces 22 of the spiders 14 through 14b. The elements 20 are provided with a radially inner surface 23 which engages the radially outer surface of the annular bags 13 and the depending legs 21 terminate in a flange 24 about which is resiliently held an annularly continuous helical spring 25 which urges elements 20 radially inward. In the unexpanded portion, as shown in the left side of FIG. 1, the flange 24 of each of the elements 20 engages a flange 26 on the members 27 which positively stops the radially inner movement of the elements 20. Likewise, the flanges 24 engage an annular flange 29 provided on the members 27 when the bladders 13 are inflated to radially expand the drum to the position indicated by the chain-dotted line in FIG. 1.

A suitable ply turn-up device 28 is secured to each end of the drum which comprises a rigid cylindrical support 30 having a radially depending flange 31 which engages the outboard members 32 and is secured by a plurality of bolts 33 directly to the members 32 of the drum. An annular inflatable flexible rubber bag 34 is mounted on the support 30 and in its uninflated position the bag 34 has an outer diameter substantially the same as the outer diameter of the drum. The bag 34 is inflatable into a torque shape to lift the ply endings and turn them around the bead ring after which the bags are contacted by suitable pushing members and moved axially of the drum in a manner well known in the art.

As shown in FIG. 3, each of the elements 20 is provided with thin metal arcuate shape cover plates 35 suitably secured thereto which are coextensive with the complete length of elements 20. Plates 35 extend circumferentially beyond elements 20 into overlapping engagement with adjacent plates so as to bridge the spaces between the elements as the drum is radially expanded. The elements 35 also extend axially of the element 20 into overlapping relationship so that plates 35 bridge the axial gaps existing between the elements 20 when the drum is axially expanded.

The plates 35 provide a radially and circumferentially rigid work surface for the drum and in order to eliminate any bridging of the tire fabric across the edges of the plate 35 a cyindrical flexible stretchable elastomeric cover 36 completely encloses the plate 35. Cover 36 is provided at each end with radially inwardly extending portions 37 which extend around the shoulder 38 of the elements 20, across the radially extending surface 39 and coextensively across the axially extending surface 40. The ends of the cover or sleeve 36 terminate in an enlarged bead 41.

In accordance with this invention a locking mechanism 42 having a base plate 43 is secured by suitable screws 44 to each of the elements 20 as shown in FIG. 3. The base plate 43 of the locking mechanism 42 has a link 45 pivotably secured to plate 43 at pivot point 46 which engages a portion of the periphery of the bead 41. A pair of links 47 and 48 connect the link 45 to the pivot point 49 on the base plate 43. The link 47 is pivoted at 50 to the link 45 and the links 47 and 48 are pivotably connected together at pivot point 52.

In the locked position as shown in FIG. 2, the link 45 is held against the bead 41 under sufficient pressure to slightly compress the rubber therein and since the combined length of links 47 and 48 are slightly greater than the distance between the pivot points 49 and 50, the biasing of the link 45 against the bead 41 causes the links 47 and 48 and the pivot 52 to be urged toward the pivot point 46. In the locked position the pivot 50 is located outboard or axially outwardly of all the other pivot points and the pivot point 52 is inboard of a line drawn between the pivot points 50 and 49. Thus, the biasing of the link 45 by the bead 41 causes the links 47 and 48 to be held in an "off center" or locked position. The link 47 is provided with an extension 51 which may be manually moved away from bead 41 to pivot the links 47 and 48, so as to overcome the biasing effect of the link 45 against the bead 41. The link 45 is thereby moved out of engagement with bead 41 to thereby unlock the bead 41 and move the locking mechanism into its open position, as shown in dotted lines in FIG. 2.

It is thus seen that in the event the sleeve or cover 36 requires replacement, or in the event the sleeve or cover 36 requires removal for repair, maintenance or adjustment of the internal mechanism of the drum, the sleeve may be easily unlocked from the drum by merely manually flipping extension 51 of each of the locking mechanisms 42 and stretching bead 41 around the shoulder of the drum.

While certain representative embodiments and details have been shown for the purpose of illustrating the invention, it will be apparent to those skilled in this art that various changes and modifications may be made therein without departing from the spirit or scope of the invention.

What is claimed is:

1. A tire building drum comprising in combination a rigid support defining a cylindrical surface, a sleeve made of an elastomeric material surrounding said rigid support and a plurality of locking mechanisms, each mechanism comprising a plurality of pivotable links, one of said links engaging the ends of said sleeve when said mechanism is in closed position, said one link being disengaged from said sleeve when the mechanism is in open position, another of said links being secured to said support when the locking mechanism is in both open and closed position.

2. A tire building drum, comprising in combination a plurality of radially movable rigid elements collectively defining a substantially cylindrical surface having end shoulders, a resilient flexible cover extending circumferentially around said elements, each end of said cover extending around the shoulders of the drum, and a plurality of mechanisms each respectively secured to one of said elements for locking the ends of said cover to the elements, said mechanisms including a plurality of links which are pivotably mounted together in series, one of said links engaging said cover, and two of said links holding said one link in said engaging position.

3. A drum as claimed in claim 2, in which the pivot point between said one link and said two links is axially outboard of all other pivot points of said links.

References Cited in the file of this patent

UNITED STATES PATENTS

| | | |
|---|---|---|
| 2,979,110 | Henley | Apr. 11, 1961 |
| 2,988,132 | Vanzo et al. | June 13, 1961 |
| 3,035,629 | Vanzo et al | May 22, 1962 |
| 3,077,917 | Appleby | Feb. 19, 1963 |